Figure 1:
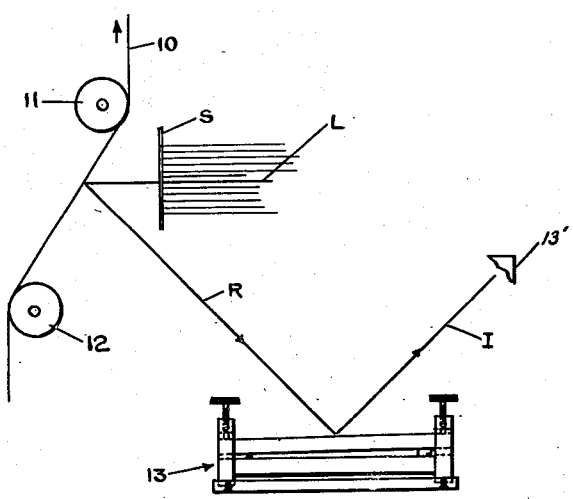

Aug. 15, 1950     J. H. TEEPLE ET AL     2,518,647
INTERFEROMETER MEANS FOR THICKNESS MEASUREMENTS
Filed Jan. 7, 1948     2 Sheets-Sheet 1

INVENTORS
JOHN H. TEEPLE.
ABRAHAM STRICKLER
ATTORNEYS

Aug. 15, 1950   J. H. TEEPLE ET AL   2,518,647
INTERFEROMETER MEANS FOR THICKNESS MEASUREMENTS
Filed Jan. 7, 1948   2 Sheets-Sheet 2

INVENTORS
JOHN H. TEEPLE.
ABRAHAM STRICKLER
BY
ATTORNEYS.

Patented Aug. 15, 1950

2,518,647

UNITED STATES PATENT OFFICE 2,518,647

INTERFEROMETER MEANS FOR THICKNESS MEASUREMENTS

John H. Teeple, Caldwell, N. J., and Abraham Strickler, New York, N. Y., assignors to Celanese Corporation of America, a corporation of Delaware Application January 7, 1948, Serial No. 874

3 Claims. (Cl. 88—14)

This invention relates to an optical measuring system and relates more particularly to an optical system for measuring the thickness of films, foils or other sheet materials having a basis of a transparent or relatively transparent material by the application of interferometric methods.

Various devices have heretofore been provided for measuring the thickness of thin sheet materials such as films, foils and the like. All of the usual measuring devices, however, require some degree of contact with one or both surfaces of the sheet material whose thickness is being measured. In the case of films and foils which are formed by casting operations employing a volatile solvent or by extrusion and coagulation as in the case of regenerated cellulose, the necessity for such surface contact is quite disadvantageous. Due to the relatively soft surfaces which such materials possess directly upon being formed, contact therewith is highly undesirable since such contact will mar the surfaces. Accordingly, any measurement of the thickness must be made at some distance from the point at which said films and foils are formed so as to enable the latter to harden sufficiently to resist any marring of the surface by contact therewith. Thus, any variation in the thickness of the film or foil from the desired dimension cannot be detected immediately and accordingly, a considerable amount of the sheet material is usually formed before such a change in dimensions is detected and a suitable adjustment made to compensate for the dimensional change. Sheet materials having dimensions outside the necessary tolerance limits must be discarded and this factor is responsible for substantial losses. These, and other disadvantages in the thickness measuring or gauging devices heretofore known, limit the usefulness of the same where it is desired to effect the continuous and accurate gauging of moving films and foils in large-scale, industrial operations.

As is well-known, the thickness of extremely thin transparent or relatively transparent films may be determined by an observation of the interference fringes or areas of interference color which appear on said films when the latter are illuminated with white light. This phenomenon may be observed, however, only when the films in question have a thickness no greater than about four times the wave length of light. Even the thinnest of the commercial transparent or semi-transparent sheet materials are of a much greater thickness than this and consequently interference patterns cannot be seen therein since these patterns cancel each other out. While interference fringes can be observed by means of monochromatic light in films of commercial thickness, the process of measuring film thickness by this means using any existing methods, is too tedious and requires too complicated an arrangement of equipment to be practicable for rapid measurement, or for measurement at all on sheets of large area. Thus, the direct application of interferometric means for measuring the thickness of said sheet materials has not been a practical method. The advantages of applying an interferometric method of measuring the thickness of transparent or semi-transparent films, foils or sheet materials are quite obvious since such methods are highly accurate and can be applied in connection with said materials without any physical contact with the surface of the sheet material whose thickness is being measured.

It is, accordingly, an important object of this invention to provide an improved optical system including an interferometric compensating device comprising, for example, an optical wedge for the direct measurement of the thickness of films, foils or other sheet materials of a transparent or semi-transparent material wherein said thickness measurement is effected without any physical contact being made with the sheet material whose thickness is to be measured.

Another object of this invention is the provision of means for measuring the thickness of transparent or semi-transparent films or sheet materials whereby no part of the instrument need be on the opposite side of the sheet from the observer when making the said thickness measurements.

A further object of this invention is the provision of thickness measuring means for continuously measuring the thickness of transparent or semi-transparent sheet materials which are capable of operating at a distance from the sheet material whose thickness is being measured and while said sheet is continuously moving.

Another object of this invention is the provision of a thickness measuring means including an interferometric compensating device whose accuracy of measurement is relatively independent of movement or whipping of the sheet through many times greater distance than the thickness of the sheet.

Still another object of this invention is the provision of a thickness measuring means, including an interferometric compensating device which is applicable to the measurement of even the thinnest commercial transparent films with greater accuracy than attainable by other methods.

Yet another object of this invention is the provision of an optical system including interferometric measuring means comprising, for example, an optical wedge and adapted to be employed in measuring the thickness of transparent or semitransparent sheet materials wherein the thickness of the same may be determined directly in terms of their absolute thickness in any desired measuring unit.

Other objects of this invention will appear from the following detailed description and the accompanying drawing.

Figure 2:
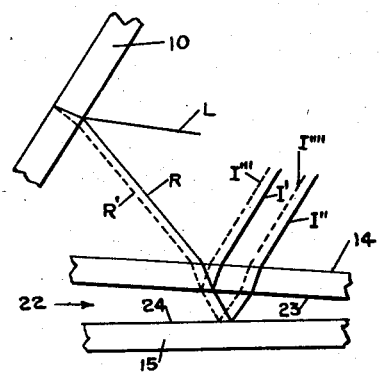
Figure 3:
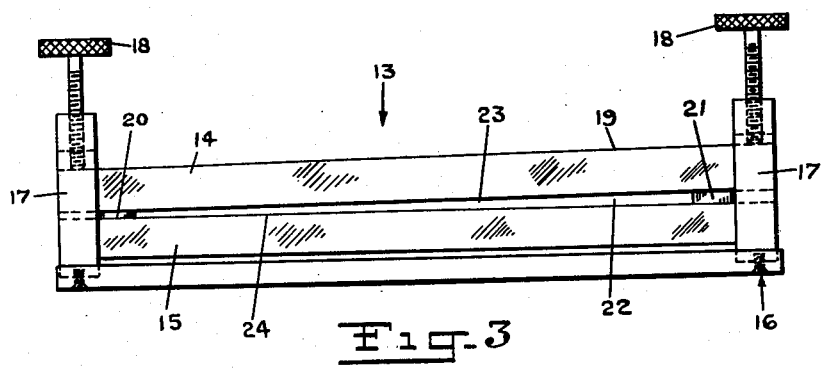
Figure 4:
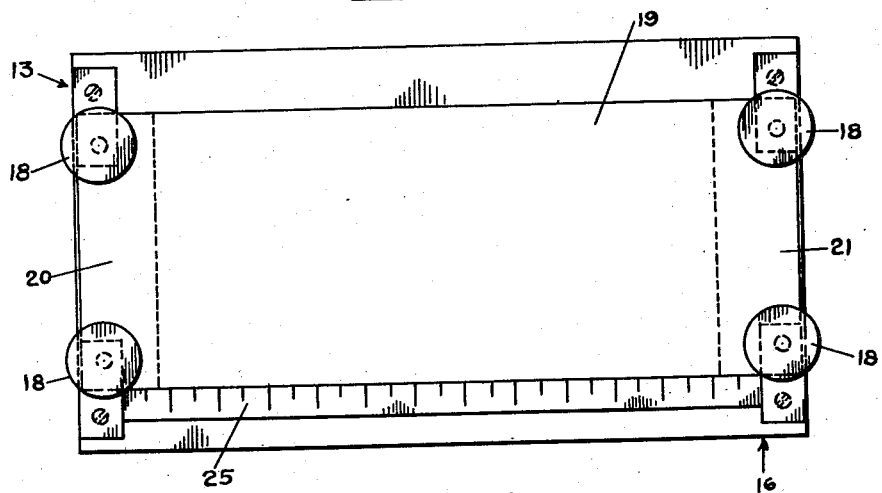
Figure 5:
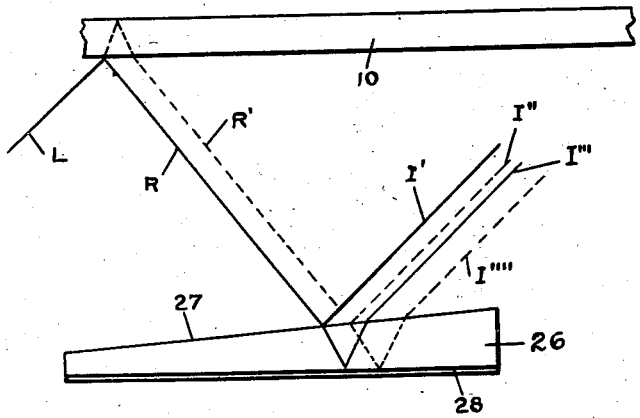

In the drawing, wherein the preferred embodiments of the optical system and thickness measuring means of our invention are shown, Fig. 1 is a schematic diagram of the optical system employed in connection with our novel measuring device showing a moving film whose thickness is to be measured, the path of the light rays through the system and the interferometric compensating optical wedge, Fig. 2 is a detail view on an enlarged scale of the path of the light rays through the film and the compensating optical wedge, Fig. 3 is a side elevational view of one form of compensator showing an optical wedge employed in said optical system including a pair of inclined, mirrored optical flats held in a frame in a fixed, spaced relationship, Fig. 4 is a plan view of said compensating optical wedge, and Fig. 5 is a schematic diagram on an enlarged scale of the path along which the light rays employed in connection with our novel optical system pass during thickness measurement operations and showing another form of compensating optical wedge.

Like reference numerals indicate like parts throughout the several views of the drawing.

Referring now to the drawing and, more particularly to Fig. 1, there is shown a film 10, formed of any suitable transparent or semitransparent material, moving in the direction indicated by the arrow and formed by a suitable film-casting or extrusion operation. Film 10 is guided in a given path by a pair of guide rollers 11 and 12 and is directed to suitable reel or take-up means (not shown). In order to measure the thickness of film 10, a plurality of beams of white light are directed toward film 10 through a diffusing screen S. For the sake of clarity, the path of only one of said light beams will be followed. Thus, light beam L from the light source provided strikes the surface of the moving film 10 and is partially reflected therefrom in the form of light beam R. Light beam R is caused to fall on to an interferometer consisting of an optical wedge and generally indicated by reference numeral 13, the construction and mode of operation of which will hereinafter be described in detail. Light beam R impinges upon interferometer 13 and is refracted therein and reflected therefrom in the form of light beam I. Actually, reflected beam R as well as light beam I do not each consist of a single beam of light but are so shown in Fig. 1 merely for the sake of clarity. The construction and arrangement of parts of the optical system shown, including film 10 and interferometer 13, is such that when reflected light beam R strikes said interferometer 13 an interference pattern is formed at some point therein the position of which is determined by the thickness of film 10 and can be observed by the eye 13' of an observer when at the position shown. By providing interferometer 13 with a suitable calibrated laterally disposed scale (not shown in Fig. 1) the thickness of film 10 can be read off directly from said scale by the position at which the interference pattern formed in interferometer 13 is observed.

In the embodiment shown in Fig. 3, interferometer 13 comprises a pair of optical flats 14 and 15 held in a rectangular frame indicated by reference numeral 16 having a plurality of upright studs 17 attached thereto each having knurled thumbscrews 18 threaded therein which bear on the upper surface 19 of optical flat 14. Optical flats 14 and 15 are separated by a pair of shims 20 and 21 of different thickness thus forming a tapered air space or optical wedge 22, the optical thickness of which is greater at one end than at the other. The lower surface 23 of optical flat 14 is partially silvered so as to reflect about 30% of the light impinging thereon while the upper surface 24 of optical flat 15 is fully silvered to produce a full mirror reflectance. The angle between optical flats 14 and 15 is so adjusted by the use of shims 20 and 21 of the proper thickness that the tapered air wedge 22 will vary in thickness from one end to the other and will be of about the same optical thickness as the film whose thickness is to be measured at one portion thereof. To observe the interference pattern, the position of the interferometer is shifted in a horizontal plane either toward or away from the moving film 10 in order to vary the thickness of the air wedge at the point of reflectance. Thus the reflected beam of light R coming from the surface of film 10 and striking interferometer 13 will form an interference pattern therein at that point where the optical thickness of air wedge 22 and the optical thickness of film 10 do not differ in dimensions by more than a few wave lengths of light. With the thickness of air wedge 22 being known at every point as well as the indices of refraction of the materials in the optical system being known, and the angles of incidence of the light on the film and wedge also being known, interferometer 13 may be suitably calibrated and provided with a scale 25 so that the thickness of film 10 may be read directly from said scale depending upon where the interference pattern is formed relative to said scale.

The manner in which the interference fringes or pattern is formed may be observed more clearly by following the path of the light beam L through the film 10 and interferometer 13, as more particularly shown in Fig. 2 wherein said elements are shown on a greatly enlarged scale for the sake of clarity.

Thus, when the beam of white light L is caused to strike the surface of film 10, part of the light beam L is reflected as a beam R with the remainder passing through film 10 and being refracted and then reflected as beam R' from the rear surface of film 10. Light beams R and R' are out of phase by too many wave lengths due to the great difference in optical path caused by the relatively great thickness of film 10, to show any visible interference fringes as they emerge from film 10. When reflected beam R enters the upper optical flat 14, it is refracted and partly reflected from the partially mirrored surface 23 of interferometer 13 as a beam I', the remainder of beam R passing through the partially mirrored surface 23 and across air wedge 22 and being reflected from fully mirrored surface 24 as a beam I''. Beam R' is also reflected in part from partially mirrored surface 23 and emerges from optical flat 14 as a beam I''', the remainder passing through air wedge 22, and after being reflected from fully mirrored surface 24, emerging from the optical system of interferometer 13 as a beam I''''. The emerging light beams I' and I'''' are out of phase to an even greater extent than beams R and R' from which they are originally derived and no interference fringe or pattern will form. However, where the optical thickness of air wedge or gap 22 is very nearly the optical thickness of film 10, the optical paths of light beams I'' and I''' will be very nearly equal on emerging from the optical system and will, accordingly, produce an interference fringe or pattern when said rays are observed by looking at them along the direction of propagation.

Thus, since the separate light beams R and R' enter the optical system of interferometer 13 out of phase by an amount which is a function of the thickness of film 10 and are caused to be brought into phase, at least in part, by the difference in path traversed in said optical system wherein the variable is the thickness of the air wedge 22, if the thickness of the air wedge 22 is known at all points and the indices of refraction of the materials composing the film 10 and the optical system of the interferometer 13 are known, then a scale such as that indicated by reference numeral 25 in Fig. 4 may be attached to the interferometer to enable the thickness of film 10 to be read directly from the position of the observed interference fringe or pattern.

While the embodiment of our invention shown in Figs. 1, 2 and 3 indicates that the compensating interferometer means for modifying the relative optical paths of the light beams R and R' comprises an air wedge between two optical flats, the wedge may comprise any suitable material for modifying said optical path and may be a liquid wedge (not shown) or a suitably mirrored glass wedge 26 as shown in Fig. 5.

Furthermore, the compensating device may be a pair of wedge-shaped discs or a pair of parallel plates whose effective optical thickness is changed at the point of observation by rotation in a horizontal plane or about a horizontal axis rather than translation as described in connection with Figs. 1 and 2. Thus, numerous modifications for varying the optical path may be employed.

Referring now to Fig. 5, a light beam L is directed toward film 10 whose thickness is to be measured and a part of beam L is reflected from the front surface of film 10 as a beam R, the remainder entering film 10 and being refracted and reflected as a light beam R'. Light beams R and R' are out of phase due to the thickness of film 10 and these reflected light beams are then caused to impinge on glass wedge 26 which is of gradually increasing thickness, the dimensions of the same being such that a part thereof is of the same thickness as the film 10 from which light beams R and R' are reflected. The upper surface 27 of glass wedge 26 is partially mirrored while the lower surface 28 is fully mirrored. Thus, when light beam R strikes the surface of glass wedge 26 a part is reflected from the partially mirrored surface 27 as a light beam I' while the remainder is refracted and reflected from fully mirrored surface 28 and emerges as a light beam I'''. Similarly, reflected light beam R' on striking the upper surface 27 of glass wedge 26 is partly reflected as a light beam I'', while the remainder enters glass wedge 26 and is refracted and then reflected from fully mirrored surface 28 as a light beam I''''.

Light beams I' and I'''' are many wave lengths out of phase due to the great difference in optical path and no interference fringe or pattern can be observed. However, it will be noted that the optical paths of light beams I'' and I''' are very nearly equal and, accordingly, interference fringes are produced by these rays and may be observed by looking backward along the direction of propagation of said rays.

As stated above, if the thickness of glass wedge 26 is known at all points and the refractive indices of the materials composing the film and wedge are known, the latter may be provided with a calibrated scale from which the thickness of film 10 may be read directly depending upon the lateral position relative to said wedge 26 at which the interference fringes or pattern is observed to be formed.

It is to be understood that the foregoing detailed description is given merely by way of illustration and that many variations may be made therein without departing from the spirit of our invention.

Having described our invention, what we desire to secure by Letters Patent is:

1. In an optical measuring system for measuring the thickness of a transparent sheet material without any physical contact with a surface of said sheet material, the combination of means for directing light beams against a transparent sheet material to produce reflected light beams, from the near and far surfaces of said sheet material, whose waves are out of phase by a distance which is a function of the thickness of said sheet material, interferometric optical means including an optical wedge, having a bar of spaced optical surface means disposed at an angle to each other, the upper surface means being partially reflecting and transmitting and the lower surface means being totally reflecting, for intercepting said out of phase reflected light waves and causing the same to traverse an optical path including said optical wedge wherein they are in part brought back into phase and form an interference pattern where the thickness of the optical wedge coincides substantially with the thickness of said sheet material, and a scale cooperating with said optical wedge and calibrated with respect thereto, whereby the position of the interference pattern relative to said scale indicates the absolute thickness of said sheet material.

2. In an optical measuring system for measuring the thickness of a transparent sheet material without any physical contact with a surface of said sheet material, the combination of means for directing light beams against a transparent sheet material to produce reflected light beams, from the near and far surfaces of said sheet material, whose waves are out of phase by a distance which is a function of the thickness of said sheet material and interferometric optical means including an optical wedge formed of a refracting material having a partially reflecting upper surface and a totally reflecting lower surface for intercepting said out of phase reflected light beams and causing the same to traverse an optical path including said optical wedge wherein they are in part brought back into phase and form an interference pattern where the thickness of the optical wedge coincides substantially with the thickness of said sheet material and a scale cooperating with said optical wedge and calibrated with respect thereto whereby the position of the interference pattern relative to said scale indicates the absolute thickness of said sheet material.

3. In an optical measuring system for measuring the thickness of a transparent sheet material without any physical contact with a surface of said sheet material, the combination of means for directing light beams against a transparent sheet material to produce reflected light beams, from the near and far surfaces of said sheet material, whose waves are out of phase by a distance which is a function of the thickness of said sheet material and interferometric optical means including an optical wedge formed of a pair of optical flats disposed at an angle to each other, the upper optical flat having a partially reflecting lower surface and the lower optical flat having a totally reflecting upper surface for intercepting said out of phase reflected light beams and causing the same to traverse an optical path including said optical wedge wherein they are in part brought back into phase and form an interference pattern where the thickness of the optical wedge coincides substantially with the thickness of said sheet material, and a scale cooperating with said optical wedge and calibrated with respect thereto whereby the position of the interference pattern relative to said scale indicates the absolute thickness of said sheet material.

JOHN H. TEEPLE.
ABRAHAM STRICKLER.

REFERENCES CITED

The following references are of record in the file of this patent:

UNITED STATES PATENTS

| Number | Name | Date |
|---|---|---|
| 2,312,888 | Everest | Mar. 2, 1943 |
| 2,338,981 | Straub | Jan. 11, 1944 |
| 2,425,758 | Saunders | Aug. 19, 1947 |

OTHER REFERENCES

Jenkins and White, Text, Fundamentals of Physical Optics (1937), published by McGraw-Hill Book Co., New York, page 80.